Figure 1:
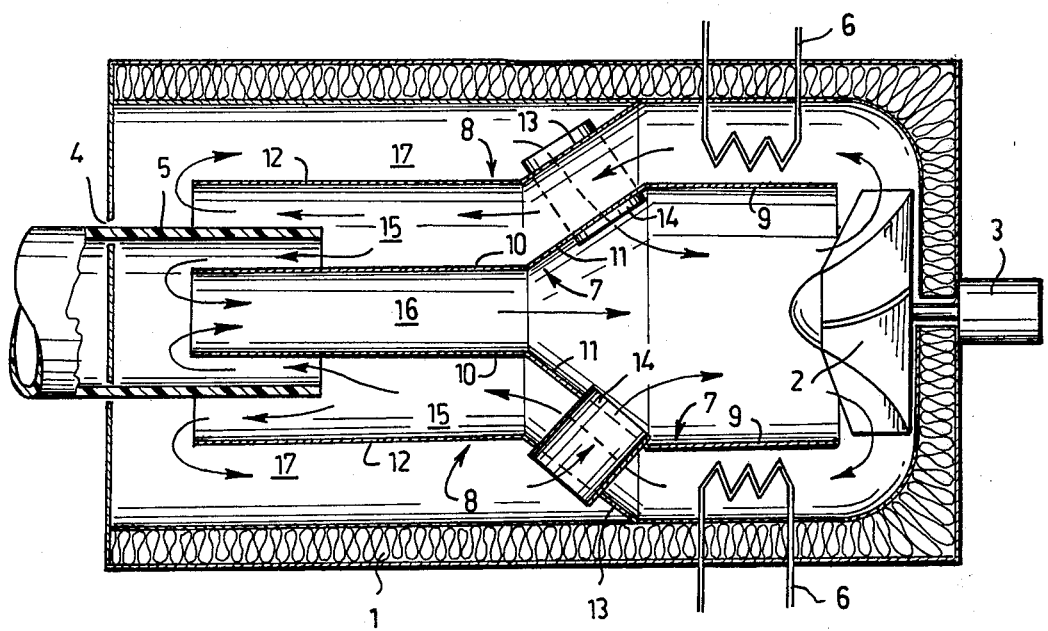

United States Patent [19]

Salmela et al.

[11] 4,352,659
[45] Oct. 5, 1982

[54] METHOD OF HEATING AN END OF A LENGTH OF PLASTIC PIPE AND A CIRCULATING AIR FURNACE FOR CARRYING OUT THE METHOD

[75] Inventors: Erkki Salmela, Lahti; Väinö Kulo, Uusikylä, both of, Finland

[73] Assignee: Asko-Uop Oy, Lahti, Finland

[21] Appl. No.: 279,521

[22] Filed: Jul. 1, 1981

[30] Foreign Application Priority Data

May 7, 1981 [FI] Finland .................................. 811410

[51] Int. Cl.³ ........................... F27D 5/00; F24J 3/00; F26B 25/00
[52] U.S. Cl. ...................................... 432/10; 34/104; 219/368; 219/400; 432/225
[58] Field of Search ............... 432/9, 10, 225; 34/104; 219/368, 400

[56] References Cited

U.S. PATENT DOCUMENTS

| | | | |
|---|---|---|---|
| 3,706,824 | 12/1972 | Huber et al. | 34/104 |
| 4,014,640 | 3/1977 | Emery et al. | 432/225 |
| 4,203,721 | 5/1980 | Hayes et al. | 432/10 |
| 4,255,137 | 3/1981 | Guyer | 432/225 |

Primary Examiner—John J. Camby

[57] ABSTRACT

A method and a circulating-air furnace for heating one end of a length of plastic pipe for the purpose of belling the end of the pipe. The circulating air is made to flow through a fan and a heater and thereinafter along the outer and inner faces of the pipe end. In order to improve the adjustability of the heating of the pipe end, the circulating air is blown as an annular shaped flow in the direction of the center axis of the pipe end towards the pipe end so that the air flow is divided onto the inner and outer faces of the pipe.

8 Claims, 3 Drawing Figures

METHOD OF HEATING AN END OF A LENGTH OF PLASTIC PIPE AND A CIRCULATING AIR FURNACE FOR CARRYING OUT THE METHOD

The subject of the present invention is a method of heating an end of a plastic pipe to a plastic state in a circulating-air furnace, whereby the circulating air is made to flow through a fan and a heater and thereinafter over the outer and inner surfaces of the pipe end, from where it is returned to the fan and the heater. Another subject of the invention is a circulating-air furnace for carrying out the method.

In order to form a socket or bell at the end of a plastic pipe, the end of the pipe must be heated to the plastic state. The heating can be accomplished in many different ways, of which hot-air heating has proved highly suitable.

From the U.S. Pat. No. 4,014,640 a circulating-air furnace is known wherein a fan, placed at one end of the furnace, blows the air through an electrical resistance heater to the outer end of the furnace, where the end of the plastic pipe is placed. The hot circulating air first meets the outer face of the plastic pipe at a point spaced from the edge of the pipe. From this point the air moves along the outer face of the plastic pipe up the edge of the pipe, turns around the edge and flows back along the inner face of the tube, until it turns further inwards and returns along a centre channel, placed on the centre axis of the pipe, to the fan. Such a circulating-air furnace involves certain drawbacks. Since the hot air first meets the root of the bell to be shaped, this point starts heating sooner than the other parts of the end of the pipe. The coldest air heats the inner face of the root of the bell. Under these circumstances, the heating is directed at the wall of the pipe asymmetrically, which readily causes detrimental deformation phenomena in the pipe. For example, the pipe tends to be pursed up at its mouth, which makes the subsequent pushing of the pipe onto a shaping mandrel more difficult. If the heating time is short, the inner face of the root of the bell may still be cold at the time of belling, in which case the pipe gets stuck halfway on the mandrel. By prolonging the heating time it is possible to reduce the pursing up of the pipe mouth and to improve the heating of the inner face. However, even a little contraction at the mouth of the pipe increases the resistance to the pushing onto the mandrel to such an extent that, when the root of the bell is warm, the pipe tends to be wrinkled at this section when it is being pushed onto the mandrel. When the heating time is extended further, the temperature close to the mouth of the pipe at the inner and outer face of the pipe is equalized, whereby the mouth of the pipe is substantially straight. Then there is, however, the risk that the outer face at the root of the bell is burnt. Moreover, a long heating time reduces the capacity of the circulating-air furnace and the consumption of energy is increased. Since the circulating air passes from the heater resistance to the heating object along the inner face of the outer wall of furnace, the furnace must have either thick heat insulation or efficient heating resistances in order that the air should not be cooled unduly on its way to the heating object. In practice, the insulation thickness is limited by the surrounding machine units, so that, as a rule, high resistance capacities are used.

In the circulating-air furnace in accordance with the said specification the air flowing from the plastic pipe to the fan must pass through a centre channel. This has been noticed as a drawback especially when small pipes are heated, because the diameter of the centre channel is then quite small and the flow resistance in a small pipe may slow down the passage of air even to such an extent that a good heating result may be risked. The situation can be improved by means of a more efficient fan. Since the centre channel is, however, on the suction side of the fan, the fan must be made disproportionately much larger. This is disadvantageous in view of the utilization of both space and energy.

The object of the present invention is to provide a method for heating the end of a plastic pipe by means of which the end of the pipe is heated more uniformly and with a lower energy consumption. The method is characterized in that the furnace is provided with an annular air flow passage which is arranged so as to receive a pipe end substantially coaxial with the passage and wherein the circulating air is arranged as flowing towards the end of the pipe so that it is divided onto the inner and outer face of the pipe. Since the circulating air comes in straight towards the end of the pipe and is distributed to the inner and outer faces of the pipe, symmetrical heating of the inner and outer faces is achieved and, moreover, the mouth of the pipe is heated first and most. Since the gasket groove which is often to be formed in connection with the belling and which requires a major deformation, is placed close to the mouth of the pipe, the heating effect that is obtained in this way is highly favourable. Since the inner and outer face of the pipe is heated by means of separate partial flows, the heating of each face of the pipe can be adjusted irrespective of each other, whereby the distribution of heat can be optimized very precisely. In such a case it is possible, if desired, to make the end of the pipe wider at its mouth by means of heating. This facilitates the pushing of the pipe onto the belling mandrel.

When the heat distribution is optimized purposefully, the pipe can be made to warm up by means of a little quantity of heat without any part of the pipe being burnt. This improves the capacity and economy of the furnace. The good adjustability of the furnace improves the economy as a result of a lower percentage of disturbances and discardings.

A preferred embodiment in accordance with the invention is characterized in that the partial flow of circulating air passing along the inner face of the pipe end is returned to the fan along the centre axis of the pipe and the partial flow passing along the outer face of the pipe is returned to the fan along the inner face of the outer casing of the furnace. Since only part of the returning air flow passes along the outer wall of the furnace, the loss of heat is lower than in the prior art construction, and the loss of heat does not affect the air flowing towards the pipe. Thereby the thickness of the heat insulation and the power of the heater can be kept within reasonable limits, which improves the economy.

The invention is also concerned with a circulating-air furnace for carrying out the method suggested above. The furnace is provided with a fan for producing the flow of circulating air, with a heater for heating the circulating air, and with air flow passages for passing the circulating air through the fan and heater, and over the outer and inner faces of the end of the pipe. The circulating-air furnace is characterized in that the furnace is provided with an annular air flow passage, which is arranged so as to receive the end of a pipe, substantially coaxial with the passage, and in which the circulating air is arranged as flowing towards the end of the pipe so that it is distributed onto the inner and outer faces of the pipe.

Figure 2:
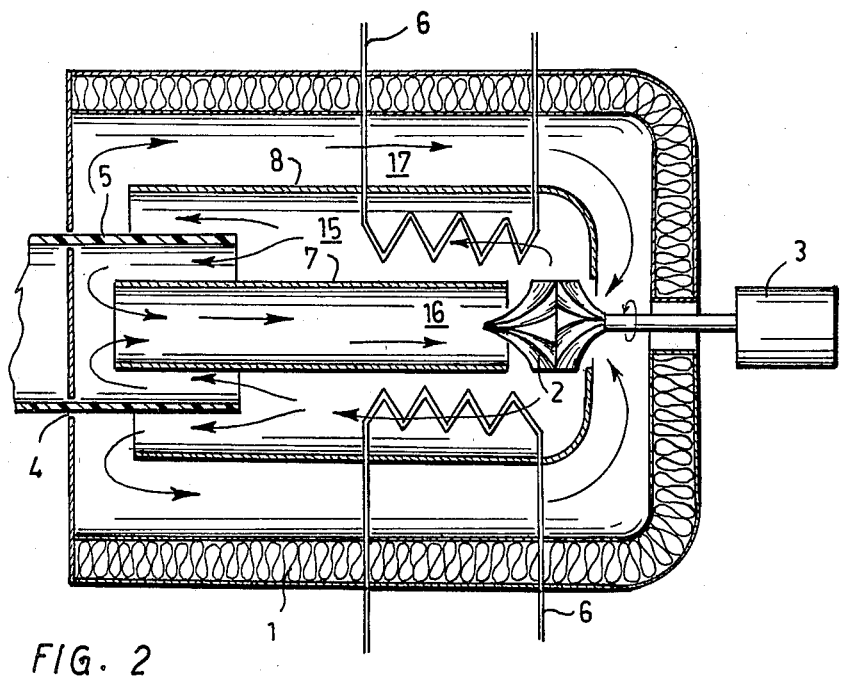
Figure 3:
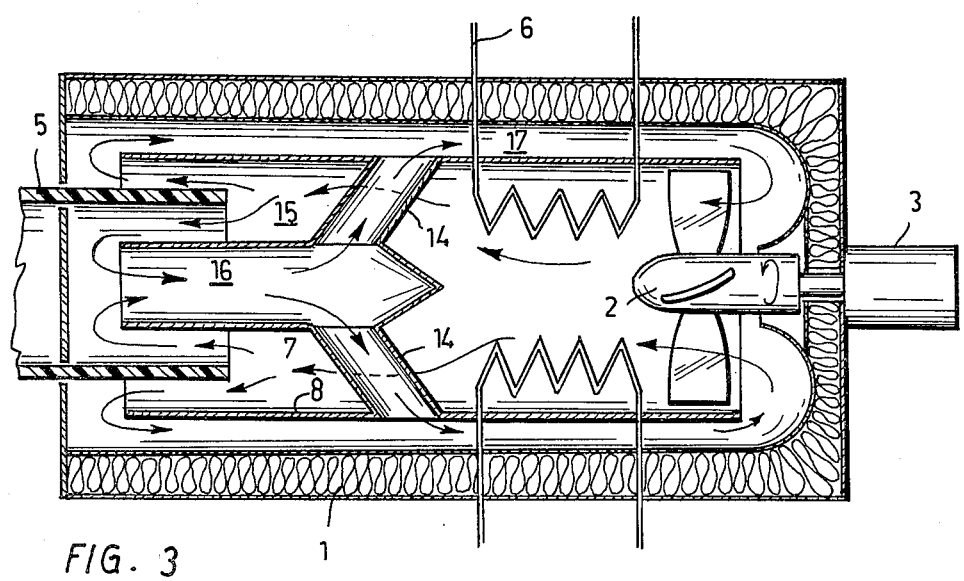

The invention will described in more detail below with references to the attached drawing, wherein FIG. 1 is a schematic illustration of a circulating-air furnace in accordance with the invention as a longitudinal section, FIG. 2 shows a second embodiment of the circulating-air furnace, and FIG. 3 shows a third embodiment of the circulating-air furnace.

The circulating-air furnace shown in FIG. 1 is made of a heat-insulated outer casing 1 to one of whose ends a fan 2 is fastened, which is driven by a motor 3. At the opposite end of the outer casing there is an annular slot 4, through which one end 5 of a length of plastic pipe can be pushed into the furnace. Moreover, electrical heating resistances 6 are fitted inside the furnace.

For the purpose of forming flow channels, there are two pipes 7 and 8 in the furnace, which are coaxial with the centre axis of the pipe end 5. The inner pipe 7 extends from the proximity of the fan to the proximity of the opposite end of the furnace. At the fan, portion 9, the diameter of the pipe corresponds to the diameter of the fan, whereas at the other end, portion 10, the diameter is somewhat smaller than the diameter of the annular slot 4. The portions 9,10 of the pipe are connected by a conical or pyramidal portion 11. The pipe 8, placed outside the pipe 7, is provided with portions 12 and 13, which are parallel to the portions 10 and 11, respectively. The diameter of the portion 12 is somewhat larger than the diameter of the annular slot 4. Between the pipe portions 11 and 13 there are pipe channels 14, which connect the space outside the portion 13 and the space inside the portion 11 to each other. The length of the pipe portions 10,12 can be adjusted so as to adjust the width of the space between the edge of the said portions and the furnace wall.

Between the pipes 7 and 8 and between the portion 9 of pipe 7 and the outer casing 1 of the furnace an annular channel 15 is formed, inside the pipe 7 a centre channel 16 is formed, and between the pipe 8 and the outer casing 1 of the furnace an outer channel 17 is formed. The electrical heating resistances 6 are located in the annular channel 15. The circulating-air furnace shown in FIG. 1 operates as follows.

The circulating air blown by the fan 2 outwards flows in accordance with the arrows through the electrical heating resistances 6, where it is heated, and thereinafter further in the annular channel 15, where it meets the end 5 of the plastic pipe placed in the annular channel, which end 5 divides the flow into two parts. It is to be noticed that between the pipe portions 10 and 12 the air flow is parallel to the centre axis of the pipe end 5. The partial flow directed inside the end of the pipe heats the inner face of the pipe end, turns at the edge of the pipe 7 inwards and returns to the fan along the centre channel 16. The partial flow directed outside the end of the pipe heats the outer face of the pipe end, turns at the edge of the pipe 8 outwards and returns through the outer channel 17 and the pipe channels 14 to the fan. The partial flows are as a rule approximately equal, but the magnitude in relation to each outer can be adjusted by changing the width of the space between the pipe portions 10,12 and the end of the furnace.

In the embodiment shown in FIG. 2 a two-sided fan 2 is used, in which case the partial flows of the circulating air need not be combined before their arrival in the fan. In this case the pipes 7, 8 are straigth, with the exception of the end closure of pipe 8, and there are no pipe channels between them. The outer channel 17 has here a length equalling the length of the entire furnace. In other respects this embodiment equals the furnace illustrated in FIG. 1.

The embodiment illustrated in FIG. 3 corresponds to the embodiment illustrated in FIG. 2 in other respects except that, out of the pipe 7, only the part next to the pipe end 5 is remaining. The cut-off end is closed and radial pipe channels 14 starts from the sides of the pipe, which channels connect the centre channel 16 to the outer channel 17. Since the partial flows are combined before arrival in the fan, the fan does not have to be two-sided like in the embodiment described above.

Within the scope of the invention, other embodiments are also conceivable. Thus, e.g., the electrical heating resistances can be replaced by some other heating units.

What we claim is:

1. A method of heating an end of a length of plastic pipe to be belled comprising the steps of
    passing air from the exhaust side of a fan across heating means, heating the air as it crosses the heating means,
    passing the heated air in the form of an annular flow substantially coaxially with a centre axis of an end of the length of pipe towards the end of the length of pipe,
    dividing the annular air flow of heated air into two partial annular air flows passing over the outer and inner surfaces, respectively, of the wall of the end of the length of pipe, and returning the heated air to the suction side of the fan.

2. The method as claimed in claim 1, further comprising returning the partial flow of the heated air passing over the inner surface of the end of pipe to the fan along the centre axis of the end of pipe and returning the partial flow passing over the outer surface of the end of pipe to the fan along the inner face of an outer cover of a circulating-air furnace.

3. The method as claimed in claim 1, further comprising dividing the annular flow of heated air substantially symmetrically onto the inner and outer surfaces of the end of pipe.

4. A circulating-air furnace for heating the end of a plastic pipe, said furnace comprising
    a housing including an outer cover defining a heating chamber having an end wall, and one end wall of which defines a plastic pipe end receiving opening,
    first pipe means extending within said chamber coaxially with a centre axis of said pipe end receiving opening one of said first pipe means being spaced from said end wall and said first pipe means having a diameter which is smaller than a diameter of said pipe end receiving opening,
    second pipe means extending within said chamber coaxially with and around said first pipe means one end of said second pipe means being spaced from said end wall,
    said first pipe means defining a first air flow passage, said first and second pipe means defining therebetween an annular air flow passage, and said second pipe means defining with said outer cover a second air flow passage,
    rotary blower means, said blower means being disposed within said chamber and having its inlet adjacent one end of said first and second air flow passages and blowing air into said annular air flow passage in which the air flow is divided into two partial air flows by the end of any plastic pipe inserted into said plastic pipe end receiving opening and the partial air flows are then sucked into said first and second air flow passages to return to the blower inlet, and, heater means disposed in an air flow path.

5. The circulating-air furnace as claimed in claim 4, wherein said partial flow of circulating air passing over the inner surface of said pipe end is arranged so as to return to the blower means along the first air flow passage and said partial flow passing over the outer surface of said pipe end is arranged to return to said blower inlet along said second air flow passage.

6. The circulating-air furnace as claimed in claim 5, wherein aid first and second air flow passages and the outer channel are combined before said heater means in the air flow direction.

7. The circulating-air furnace as claimed in claim 5, wherein said first and second air flow passages are combined before said blower inlet in the air flow direction.

8. The circulating-air furnace as claimed in claim 4, wherein the width of the spacings between said end wall and said one end of said first and second pipe means can be adjusted independently from each other so as to adjust the partial air flows inside and outside the end of said pipe.

* * * * *